United States Patent [19]

Imanaka et al.

[11] Patent Number: 4,900,772

[45] Date of Patent: Feb. 13, 1990

[54] CURABLE RESIN COMPOSITION

[75] Inventors: Masayoshi Imanaka; Koji Noda; Katsuhiko Isayama, all of Kobe, Japan

[73] Assignee: Kanegafuchi Kagaku Kogyo Kabushiki Kaisha, Osaka, Japan

[21] Appl. No.: 179,783

[22] Filed: Apr. 11, 1988

[30] Foreign Application Priority Data

Apr. 13, 1987 [JP] Japan ................................. 62-90078

[51] Int. Cl.$^4$ ............................................. C08K 5/36
[52] U.S. Cl. ..................................... 524/303; 524/94; 524/146; 524/304; 524/213; 524/333; 524/392; 525/105; 525/106
[58] Field of Search ................. 524/94, 303, 304, 333, 524/213, 146, 392; 525/342, 333.7, 105, 106

[56] References Cited

U.S. PATENT DOCUMENTS

| | | | |
|---|---|---|---|
| 2,387,518 | 10/1945 | Lightbown et al. | 524/202 |
| 2,657,982 | 11/1953 | Hill et al. | 524/392 |
| 2,981,717 | 4/1961 | Boultbee | 524/303 |
| 3,644,315 | 2/1972 | Gardner et al. | 260/85.3 |
| 4,048,420 | 9/1977 | Francois et al. | 526/240 |
| 4,247,667 | 1/1981 | Nojiri et al. | 525/342 |
| 4,276,394 | 6/1981 | Kennedy et al. | 525/245 |
| 4,316,973 | 2/1982 | Kennedy | 525/335 |
| 4,342,849 | 8/1982 | Kennedy | 525/333.7 |
| 4,412,042 | 10/1983 | Matsuura et al. | 525/333.7 |
| 4,429,099 | 1/1984 | Kennedy et al. | 528/98 |
| 4,435,536 | 3/1984 | Kato et al. | 525/342 |
| 4,524,188 | 6/1985 | Kennedy et al. | 525/333.7 |
| 4,618,650 | 10/1986 | Halasa et al. | 525/342 |
| 4,657,986 | 4/1987 | Isayama | 525/407 |
| 4,665,127 | 5/1987 | Hirose | 525/403 |

FOREIGN PATENT DOCUMENTS

| | | |
|---|---|---|
| 0252372 | 1/1988 | European Pat. Off. . |
| 46-37440 | 11/1971 | Japan . |
| 994116 | 6/1965 | United Kingdom . |
| 996824 | 6/1965 | United Kingdom . |
| 2110706 | 6/1983 | United Kingdom . |

OTHER PUBLICATIONS

J. Polymer Science: Polymer Chemistry Edition, vol. 18, 1523–1537 (1980).
J. Macromol. Sci. Chem., A15(2), pp. 215–230 (1981).

*Primary Examiner*—Veronica P. Hoke
*Attorney, Agent, or Firm*—Armstrong, Nikaido, Marmelstein, Kubovcik & Murray

[57] ABSTRACT

A curable resin composition comprising
(A) 100 parts by weight of an elastomeric organic polymer of a saturated hydrocarbon having at least one silicon-containing group cross-linkable by the formation of a siloxane bond at the molecular ends, and
(B) 0.01 to 10 parts by weight of a sulfur-containing antioxidant. The curable resin composition produces a cured product having excellent heat resistance.

9 Claims, 1 Drawing Sheet

CURABLE RESIN COMPOSITION

BACKGROUND OF THE INVENTION

The present invention relates to a curable resin composition, and more particularly to a curable resin composition comprising, as a main component, an elastomeric organic polymer of a saturated hydrocarbon having at least one silicon-containing group cross-linkable by the formation of a siloxane bond (hereinafter referred to as "reactive silicon group") at the molecular ends and having improved heat resistance.

There have been commercially prepared alkylene oxide polymers having a reactive silicon group at the molecular ends such as a propylene oxide polymer, which are curable even at ordinary temperature to form an elastomeric cured product. However, the alkylene oxide polymer is unsatisfactory in heat resistance, water resistance, weatherability, and the like.

In order to avoid the defects of the alkylene oxide polymer, saturated hydrocarbon polymers having a reactive silicon group at the molecular ends, such as an isobutylene polymer, have been studied, as disclosed in, for instance, U.S. Ser. No. 065,550. Although the saturated hydrocarbon polymer is remarkably improved in heat resistance and weatherability compared with the alkylene oxide polymer, the properties are not sufficient and its use is sometimes limited.

An object of the present invention is to provide a curable resin composition comprising, as a main component, an elastomeric organic polymer of a saturated hydrocarbon having reactive silicon groups at the molecular ends and having improved heat resistance.

The above and other objects of the present invention will become apparent from the description hereinafter.

SUMMARY OF THE INVENTION

It has now been found that when a saturated hydrocarbon polymer having reactive silicon groups at the molecular ends is combined with a sulfur-containing antioxidant, the heat resistance of the polymer is remarkably improved.

That is, in accordance with the present invention, there is provided a curable resin composition comprising (A) 100 parts by weight of an elastomeric organic polymer of a saturated hydrocarbon having at least one silicon-containing group cross-linkable by the formation of a siloxane bond at the molecular ends, and (B) 0.01 to 10 parts by weight of a sulfur-containing antioxidant.

The composition has improved heat resistance.

DETAILED DESCRIPTION

Figure 1:
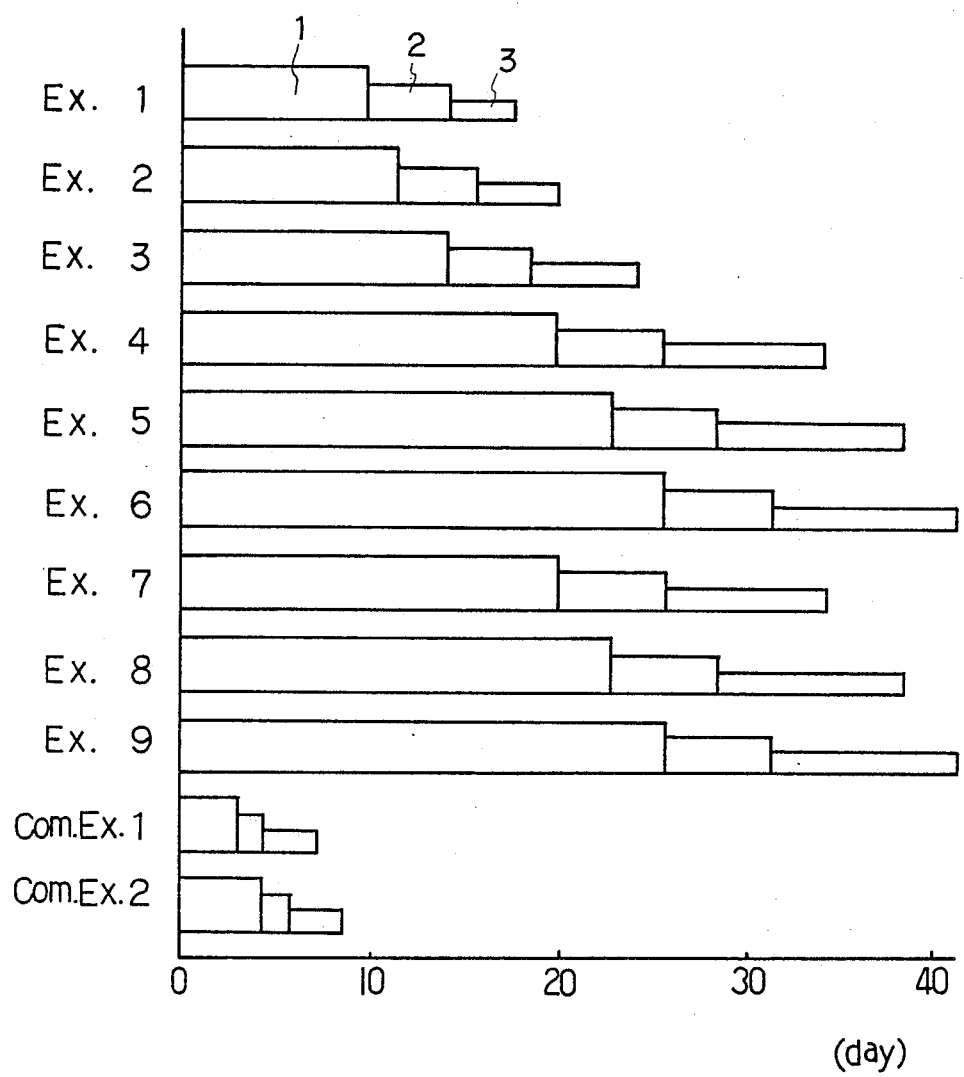
FIG. 1 illustrates bar charts representing results of measurements of heat resistance in Examples 1 to 9 and Comparative Examples 1 and 2, as described later.

In the present invention, a main chain of the saturated hydrocarbon organic polymer (A) having at least one reactive silicon group at the molecular ends is substantially composed of saturated hydrocarbon units. Polymers which form the main chain of the polymer (A) can be prepared as follows:

(1) An olefin compound having 1 to 6 carbon atoms such as ethylene, propylene, 1-butene or isobutylene is polymerized as a main monomer.

(2) A diene compound having 4 to 12 carbon atoms such as butadiene or isoprene is polymerized alone or copolymerized with the above olefin and the obtained polymer or copolymer is hydrogenated.

It is preferable that the main chain is composed essentially of repeating units of isobutylene or repeating units of hydrogenated butadiene obtained by hydrogenation of polybutadiene, from the viewpoint that the reactive groups are easily introduced into the polymer ends. Particularly, an isobutylene polymer or a hydrogenated butadiene polymer having a molecular weight of 500 to 30,000 is more preferable, especially an isobutylene polymer or a hydrogenated butadiene polymer having a molecular weight of 1,000 to 15,000, from the viewpoints of the physical properties of cured product and the workability of the curable resin composition.

The term "essentially" as used above means that the main chain may include monomer units and/or polymer units other than the above-mentioned ones.

The isobutylene polymer having reactive silicon groups at the molecular ends can be prepared by cationic polymerization methods including the Inifer method of polymerization of isobutylene as disclosed, for instance, in U.S. Pat. No. 4,276,394, U.S. Pat. No. 4,316,973, U.S. Pat. No. 4,342,849, U.S. Pat. No. 4,429,099, U.S. Pat. No. 4,524,188, Journal of Polymer Science, Polymer Chemistry Edition (J. Polym. Sci. Polym. Chem. Ed.), 18, 1523 (1980), Journal of Macromolecular Science, Chemistry A (J. Macromol. Sci. Chem.), 15, 215 (1981), and the like.

The isobutylene polymer used in the present invention includes an isobutylene copolymer as well as an isobutylene homopolymer. When preparing the isobutylene copolymer, the copolymerizable monomer(s) is(are) copolymerized with isobutylene monomer in an amount of not more than 50% by weight, preferably not more than 30% by weight, based on the isobutylene monomer, using cationic polymerization. As the copolymerizable monomers, there are exemplified, for instance, a cationic polymerizable monomer having 4 to 12 carbon atoms such as an olefin, a conjugated diene, a vinyl ether, an aromatic vinyl compound, a vinylsilane or an allylsilane. Concrete examples of the cationic polymerizable monomers are, for instance, 1-butene, 2-butene, 2-methyl-1-butene, 3-methyl-1-butene, pentene, 4-methyl-1-pentene, hexene, vinylcyclohexane, butadiene, isoprene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, γ-methacryloyloxypropylmethyldimethoxysilane, and the like.

In the cationic polymerization, an acid such as $H_2SO_4$ or $CCl_3CO_2H$, or a Friedel-Crafts catalyst such as $BCl_3$, $SnCl_4$ or $TiCl_4$ can be employed as a polymerization initiator. Also, the polymerization methods described in EP-A-0 252 372 (U.S. Ser. No. 065,550) and the like, are preferred, since according to these methods a polymer having functional groups at the molecular ends can be prepared.

The term "reactive silicon group" as used herein means a cross-linkable group containing a silicon atom to which a hydrolyzable group or a hydroxyl group is bonded and which can cross-link to produce an elastomer by the formation of a siloxane bond (Si—O—Si). An example of the reactive silicon group is a group represented by the formula (I):

$$X_a-\underset{\underset{X_b}{|}}{\overset{R^1_{3-a}}{\underset{|}{Si}}}(O-\underset{\underset{}{|}}{\overset{R^1_{2-b}}{\underset{|}{Si}}})_m \qquad (I)$$

wherein X is a hydroxyl group or a hydrolyzable group, and when more than one X group is present, the X groups are the same or different; $R^1$ is a monovalent hydrocarbon group having 1 to 20 carbon atoms or a triorganosiloxy group represented by the formula (II):

$$R^2_3SiO— \qquad (II)$$

in which each $R^2$ is a monovalent hydrocarbon group having 1 to 20 carbon atoms, and when more than one $R^1$ group is present, the $R^1$ groups are the same or different; a is 0, 1, 2, or 3, b is 0, 1 or 2, provided that $1 \leq a+mb$; and m is 0 or an integer from 1 to 18.

The reactive silicon group in which the group X is a hydrolyzable group is cross-linked by silanol condensation reaction in the presence or absence of a silanol condensation catalyst through hydrolysis with moisture. The reactive silicon group in which the group X is a hydroxyl group is cross-linked by silanol condensation reaction in the presence or absence of a silanol condensation catalyst.

Examples of the hydrolyzable group X are, for instance, known hydrolyzable groups such as a hydrogen atom, a halogen atom, an alkoxyl group, an acyloxyl group, a ketoxymate group, an amino group, an amido group, an aminoxy group, a mercapto group and an alkenyloxy group, and the like. The hydrolyzable groups are not limited thereto. Among them, the alkoxyl having 1 to 8 carbon atoms is especially preferred, because it is mildly hydrolyzed and easily handled. One to three groups X can bond to one silicon atom.

The number of the silicon atoms in the reactive silicon group may be one or more. In case of silicon atoms bonded by a siloxane bond, reactive silicon groups with at most 20 silicon atoms are preferable.

Examples of the group $R^1$ are, for instance, an alkyl group such as a methyl group, an aryl group such as a phenyl group, a vinyl group, and the like. Among them, a methyl group is especially preferable. The group $R^1$ is not limited thereto.

As the reactive silicon group, a group represented by the formula:

$$-\underset{\underset{}{|}}{\overset{R^1_{3-c}}{\underset{|}{Si}}}-X_c$$

wherein $R^1$ and X are as defined above and c is 1, 2 or 3, is preferable from the viewpoint of economy.

Methods for introducing the reactive silicon group into the elastomeric saturated hydrocarbon polymer are not particularly limited. There are, for instance, a method (1) in which a polymer having at least one unsaturated bond at the molecular ends is reacted with a hydrogenated silicon compound by a hydrosilylation reaction in the presence of a platinum compound as a catalyst, or a method (2) in which a polymer having at least one unsaturated bond at the molecular ends is reacted with a mercaptan compound having a reactive silicon group by a radical addition reaction in the presence of a radical initiator and/or a source for generating radicals, or the like, as described in, for instance, EP-A-0 252 372, and the like.

In the invention, the organic polymer (A) must have at least one, and preferably has 1.2 to 4, reactive silicon group at the molecular ends. When the number of the reactive silicon groups is less than one, the curability tends to be insufficient and it is hard to obtain a satisfactory rubber-like elasticity. Further, in the present invention, an elastomeric cured product having an excellent strength and a high elongation can be easily obtained because the chain length between cross-linking sites in the cured product is maximized due to the reactive silicon groups present at the molecular ends.

In the present invention, as an antioxidant, a sulfur-containing antioxidant (B) is used. Examples of the sulfur-containing antioxidant (B), for instance, are mercaptans, salts of mercaptans, sulfides including sulfides of carboxylic acid esters and sulfides of hindered phenol, polysulfides, salts of dithiocarboxylic acids, thioureas, thiophosphates, sulfonium compounds, thioaldehydes, thioketones, mercaptals, mercaptols, monothioacids, polythio-acids, thioamides, sulfoxides, and the like. The sulfur-containing antioxidants (B) are not limited thereto. Also, the antioxidants (B) may be used alone or as an admixture thereof.

Concrete examples of the sulfur-containing antioxidant (B) are as follows:

mercaptans: 2-mercaptobenzothiazole, and the like.

salts of mercaptans: zinc salt of 2-mercaptobenzothiazole, and the like.

sulfides: 4,4'-thio-bis(3-methyl-6-t-butylphenol), 4,4'-thio-bis(2-methyl-6-t-butylphenol), 2,2'-thio-bis(4-methyl-6-t-butylphenol), bis(3-methyl-4-hydroxy-5-t-butylbenzyl)sulfide, telephthaloyldi(2,6-dimethyl-4-t-butyl-3-hydroxybenzyl)sulfide, phenothiazine, 2,2'-thio-bis(4-octyl-phenol)nickel, dilaurylthiodipropionate, distearylthiodipropionate, dimyristylthiodipropionate, ditridecylthiodipropionate, distearyl-$\beta,\beta'$-thiodibutyrate, laurylstearylthiodipropionate, 2,2-thio[diethyl-bis-3(3,5-di-t-butyl-4-hydroxyphenol)propionate], and the like.

polysulfides: 2-benzothiazolyldisulfide, and the like.

salts of dithiocarboxylic acid: zinc dibutyldithiocarbamate, zinc diethyldithiocarbamate, nickel dibutyldithiocarbamate, zinc di-n-butyldithiocarbamate, dibutylammoniumdibutyldithiocarbamate, zinc ethylphenyldithiocarbamate, zinc dimethylcarbamate, and the like.

thioureas: 1-butyl-3-oxy-diethylene-2-thiourea, di-o-tolylthiourea, ethylenethiourea, and the like.

thiophosphates: trilauryltrithiophosphate, and the like.

The sulfur-containing compounds are not limited thereto, and any sulfur-containing compound in addition to the above-mentioned compounds can be used so long as the compound behaves as an antioxidant of the organic polymer (A).

In the composition of the present invention, the sulfur-containing antioxidant can remarkably prevent the main chain of the organic polymer (A) from decomposing and deteriorating due to heat to prevent an occurrence of surface tackiness (stickiness) of a cured product in comparison with other antioxidants having no sulfur atom.

The amount of the sulfur-containing antioxidant (B) is from 0.01 to 10 parts by weight, preferably 0.1 to 5 parts by weight, based on 100 parts of the organic polymer (A). When the amount of the antioxidant (B) is less than 0.01 part by weight, the heat resistance is insufficiently improved. On the other hand, when the amount is more than 10 parts by weight, the cured products exhibit undesirable properties such as coloring.

In the present invention, one or more kind of usual antioxidants can be used together with the sulfur-containing antioxidant (B). Examples of the usual antioxidants are, for instance, a phenol radical inhibitor such as 2,2'-methylene-bis(4-methyl-6-t-butylphenol) or tetrakis[methylene-3(3,5-di-t-butyl-4-hydroxyphenyl)-propiomethane; an ultraviolet absorber such as 2(2'-hydroxy-3',5'-di-t-butylphenyl)benzotriazole or bis(2,2,6,6-tetramethyl-4-piperidine)sebacate; a metal deactivator; an antiozonant; a light stabilizer; an amine radical chain inhibitor; a phosphorus-containing agent for decomposing a peroxide; citric acid; phosphoric acid; and the like.

A silanol condensation catalyst can be used for curing the organic polymer (A), which is the main component of the curable resin composition of the invention, as occasion demands.

Examples of the condensation catalyst are, for instance, a titanate such as tetrabutyl titanate or tetrapropyl titanate; a tin carbonate such as dibutyl tin dilaurate, dibutyl tin maleate, dibutyl tin diacetate, tin octylate or tin naphthenate; a reaction product of dibutyl tin oxide with a phthalic acid ester; dibutyl tin diacetylacetonato; an organo aluminum compound such as aluminum trisacetylacetonato, tris(ethylacetoacetate)aluminum or diisopropoxyaluminum ethyl acetoacetate; a chelate compound such as zirconium tetraacetylacetonato or titanium tetraacetylacetonato; lead octylate; an amine compound such as butylamine, monoethanolamine, triethylenetetramine, guanidine, 2-ethyl-4-methyl imidazole or 1,3-diazabicyclo(5,4,6)undecene-7 (DBU), and a salt thereof with a carboxylic acid; and other known acidic or basic silanol condensation catalysts.

The curable composition of the present invention may contain various silane compounds as a modifier for widely adjusting physical properties of the cured product, e.g., strength and elongation.

Typical examples of the silane compounds are, for instance, a silicon compound having at least one hydrolyzable group or silanol group, e.g., $(CH_3)_3SiOH$, $(CH_3CH_2)_3SiOH$, $(CH_3CH_2CH_2)_3SiOH$,

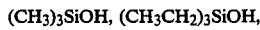
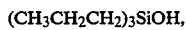
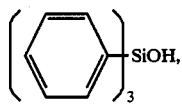

-continued

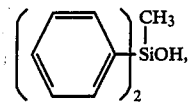

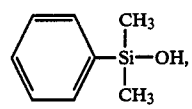

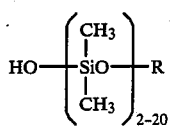

(wherein R is a hydrogen atom or a hydrocarbon group having 1 to 20 carbon atoms)

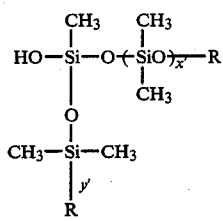

(wherein $x'+y'=1-19$, and R is as defined above)

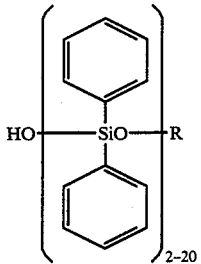

(wherein R is as defined above),

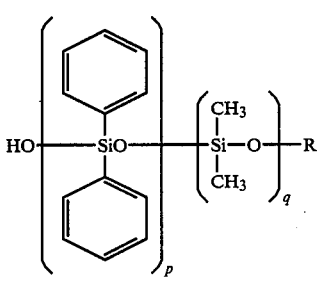

(wherein $p+q=2-20$ and R is as defined above),

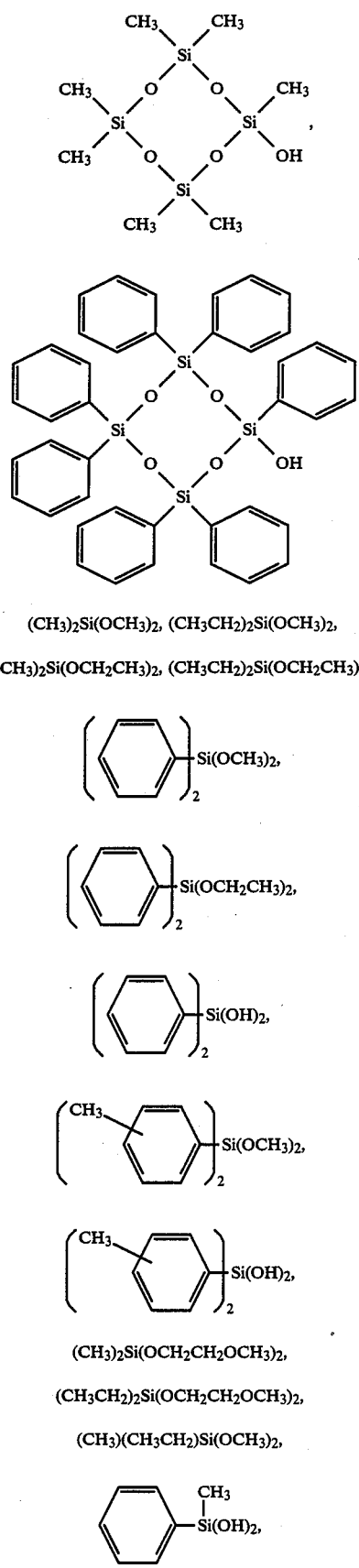
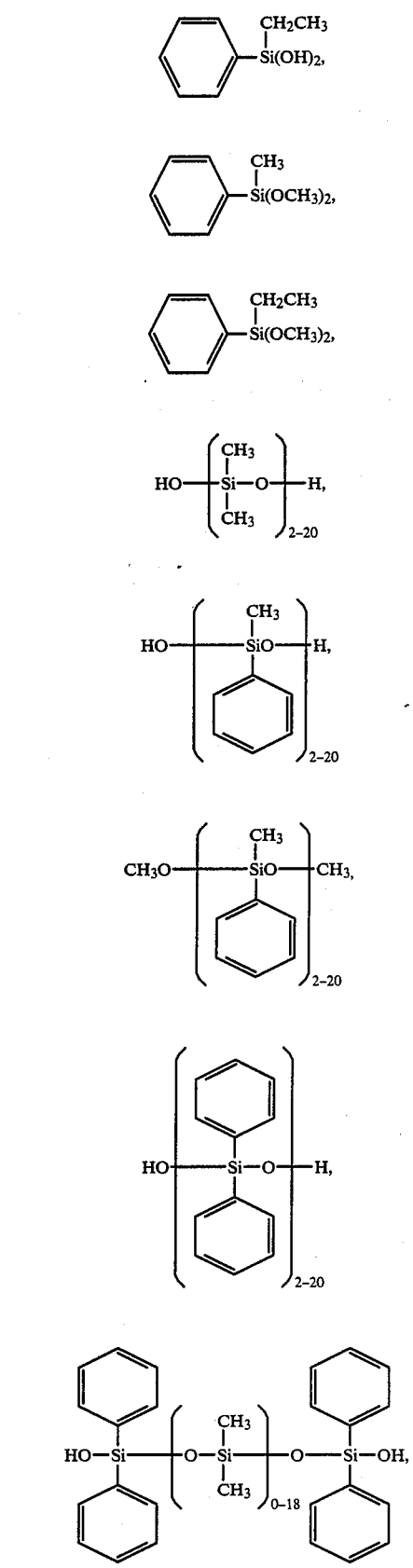

-continued

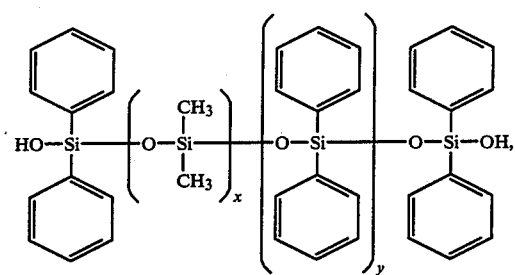

(x + y = 0–18)

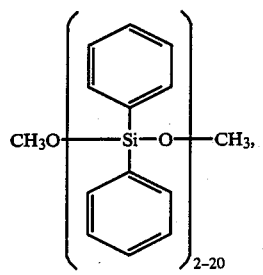

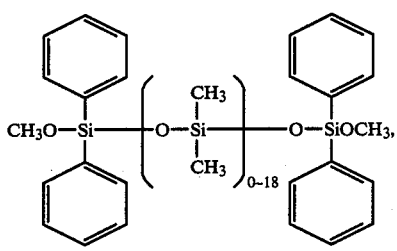

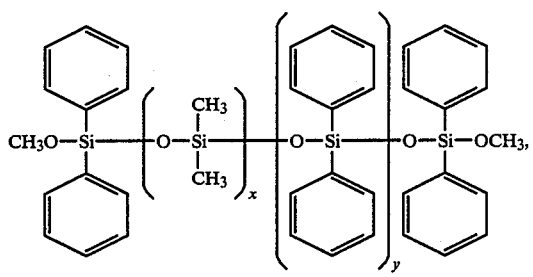

(x + y = 0–18)

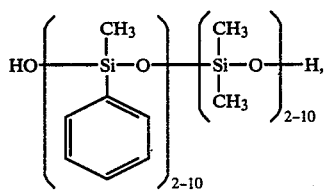

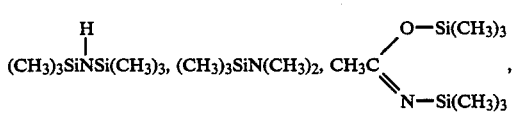

-continued

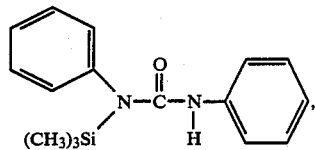

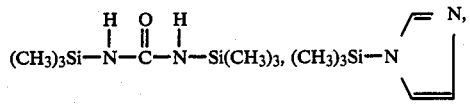

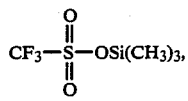

and the like. The modifier which can be used in the present invention is not limited thereto.

The curable composition of the present invention may also contain various additives, as occasion demands, e.g., fillers, plasticizers, lubricants, pigments, foaming agents, tackifiers, water, and the like.

Examples of fillers are, for instance, wood flour, pulp, cotton, asbestos, glass fiber, carbon fiber, mica, walnut shell flour, rice hull flour, graphite, diatomaceous earth, terra alba, fumed silica, finely divided anhydrous silica, silicic dioxide, carbon black, calcium carbonate, clay, talc, titanium dioxide, magnesium carbonate, quartz, aluminum powder, flint powder, zinc powder, and the like. The fillers may be employed alone or as an admixture thereof.

Examples of plasticizers are, for instance, a hydrocarbon compound such as a polybutene, a hydrogenated polybutene, ethylene-α-olefin cooligomer, an α-methylstyrene oligomer, biphenyl, triphenyl, a triaryldimethane, an alkylene triphenyl, a liquid polybutadiene, a liquid hydrogenated polybutadiene, an alkyl diphenyl or a partially hydrogenated terphenyl; a chlorinated paraffin; a phthalic acid ester such as dibutyl phthalate, diheptyl phthalate, di(2-ethylhexyl)phthalate, butylbenzyl phthalate or butylphthalylbutyl glycolate; a nonaromatic dibasic acid ester such as dioctyl adipate or dioctyl sebacate; a polyalkylene glycol ester such as diethylene glycol benzoate or triethylene glycol dibenzoate; a phosphoric acid ester such as tricresyl phosphate or tributyl phosphate; and the like. Among them, the hydrocarbon compounds having no aliphatic unsaturation are preferable. The plasticizer may be employed alone or as an admixture thereof. Also, the plasticizer may be used instead of a solvent when introducing the reactive silicon groups into the isobutylene polymer, for adjusting the reaction temperature or viscosity of the reaction system.

The adhesive properties of the curable resin composition with respect to various kinds of materials can be further improved by incorporation of one or more kinds of tackifiers such as epoxy resins, phenol resins, various silane coupling agents, e.g., aminosilane compounds and epoxysilane compounds, alkyl titanates and aromatic polyisocyanates.

The curable resin compositions of the invention can be suitably employed as an adhesive, a pressure sensitive adhesive tape, a paint, a sealant composition, a water proofing material, a spraying material, a molding material, a casting rubber material, and the like.

The present invention is more specifically described and explained by means of the following Examples and Comparative Examples in which all percentages and parts are by weight unless otherwise noted. It is to be understood that the present invention is not limited to the Examples, and various changes and modifications may be made in the invention without departing from the spirit and scope thereof.

REFERENCE EXAMPLE 1

A 100 ml four neck flask was charged with 40 g of an isobutylene polymer having an average molecular weight of about 5,000 and having isopropenyl groups at about 92% of the whole polymer ends and 2 g of toluene and degasified under reduced pressure at 90° C. for 2 hours. To the flask was added 121.7 μl of a solution of chloroplatinic acid catalyst having a concentration of 0.066 mol/l, prepared by dissolving $H_2PtCl_6.6H_2O$ in a mixture of isopropyl alcohol and tetrahydrofuran (a volume ratio of isopropyl alcohol:tetrahydrofuran of 1:2) at room temperature under a nitrogen gas atmosphere, the mixture was heated with stirring to 70° C. and the temperature thereof was lowered to room temperature. To the resultant mixture was added 2.47 g of methyldichlorosilane, and the reaction was carried out at 90° C. for 16 hours.

As a result of a determination of the residual isopropenyl groups of the isobutylene polymer in the reaction mixture according to infrared spectrophotometry, it was found that the isopropenyl groups hardly remained.

Then, 4.7 ml of methyl orthoformate and 1.7 ml of methanol were added thereto and the mixture was reacted at 70° C. for 3 hours. The reaction system was neutral at a pH of about 7. After a volatile component was distilled away under reduced pressure, 120 ml of hexane was added to the residue and stirred thoroughly. After the insoluble component was filtered off from the reaction mixture, hexane was distilled away from the filtrate to give an isobutylene polymer having groups of the formula:

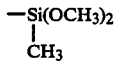

at both molecular chain ends.

According to nuclear magnetic resonance (hereinafter referred to as "NMR"), it was found that the reactive silicon groups:

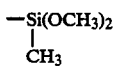

were introduced at about 86% of the molecular chain ends.

REFERENCE EXAMPLE 2

The reaction was carried out at 85° C. for 8 hours in the same manner as in Example 1 except that 40 g of a hydrogenated butadiene polymer having an average molecular weight of 3,500 and having isopropenyl groups at 76% of the whole polymer ends which was prepared by introducing isopropenyl groups into a hydrogenated polybutadiene having hydroxyl groups at the polymer ends (commercially available under the trade name "Polyter HA" made by Mitsubishi Kasei Kogyo Kabushiki Kaisha) was used instead of the isobutylene polymer used in Example 1, a solution of chloroplatinic acid catalyst wherein $H_2PtCl_2.6H_2O$ was dissolved in isopropyl alcohol having a concentration of 0.2 mol/l was used in an amount of 13.5 μl as the catalyst solution, and the amount of methyldichlorosilane 2.47 g was changed to 4.6 g.

As a result of a determination of the residual isopropenyl groups of the polymer in the reaction mixture according to infrared spectrophotometry, it was found that the isopropenyl groups hardly remained.

Then, the procedure of Example 1 was repeated except that methyl orthoformate and methanol were used in amounts of 8.7 ml and 3.2 ml, respectively, to give a hydrogenated butadiene polymer having reactive silicon groups at the polymer ends.

According to NMR, it was found that the reactive silicon groups:

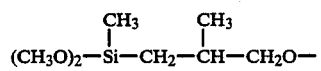

were introduced at about 100% of the whole polymer ends.

EXAMPLES 1 TO 9 AND COMPARATIVE EXAMPLES 1 AND 2

There was prepared a uniform toluene solution of the isobutylene polymer (A) having the group:

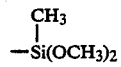

at the polymer ends obtained in Reference Example 1 or the hydrogenated butadiene polymer having the group:

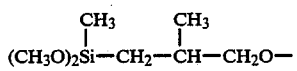

at the polymer ends obtained in Reference Example 2 with a sulfur-containing antioxidant (B) and other additives, as shown in Table 1. The amount of the each ingredient in the toluene solution is shown in Table 1.

The obtained toluene solution was poured into a frame having a thickness of about 3 mm, and it was aged at room temperature for one day, then at 50° C. for four days, and degasified under reduced pressure of 2 to 3 mmHg at 50° C. for 2 hours for completely volatilizing the toluene.

The obtained sheet of the cured product was allowed to stand in a hot air dryer having a temperature of 150° C. and the heat resistance was estimated by observing a change of the sheet with the passage of time.

The results are shown in FIG. 1. In FIG. 1, the narrower the width of the bar of each bar chart, the greater the tack of the sheet. The sheet was decomposed and began to flow at the position where the bar chart paused. That is, in FIG. 1, 1 shows that the sheet was not changed, 2 shows that the sheet had slight tack free, and 3 shows that the sheet was partially decomposed. The sheet was completely decomposed at the position where the chart paused.

TABLE 1

| Ex. No. | Component (A) Polymer obtained in Ref. Ex. 1 (part) | Component (A) Polymer obtained in Ref. Ex. 2 (part) | Component (B) Kind | Component (B) Amount (part) | Tin octylate (part) | Lauryl-amine (part) | Toluene (part) | Water (part) |
| --- | --- | --- | --- | --- | --- | --- | --- | --- |
| 1 | 100 | — | Nissan DLTP*1 | 1 | 3 | 0.75 | 50 | 0.5 |
| 2 | 100 | — | Nissan DLTP | 3 | 3 | 0.75 | 50 | 0.5 |
| 3 | 100 | — | Nissan DLTP | 5 | 3 | 0.75 | 50 | 0.5 |
| 4 | 100 | — | Nocrac 300*2 | 1 | 3 | 0.75 | 50 | 0.5 |
| 5 | 100 | — | Nocrac 300 | 3 | 3 | 0.75 | 50 | 0.5 |
| 6 | 100 | — | Nocrac 300 | 5 | 3 | 0.75 | 50 | 0.5 |
| 7 | 50 | 50 | Nocrac 300 | 1 | 3 | 0.75 | 50 | 0.5 |
| 8 | 50 | 50 | Nocrac 300 | 3 | 3 | 0.75 | 50 | 0.5 |
| 9 | 50 | 50 | Nocrac 300 | 5 | 3 | 0.75 | 50 | 0.5 |
| Com. Ex. 1 | 100 | — | — | — | 3 | 0.75 | 50 | 0.5 |
| Com. Ex. 2 | 100 | — | Irganox 1010*3 | 1 | 3 | 0.75 | 50 | 0.5 |

(Notes)
*1"Nissan DLTP" is a trade name of a sulfide of carboxylic ester antioxidant, dilauryl thiodipropionate: $S(CH_2CH_2CO_2C_{12}H_{25})_2$, commercially available from Nippon Yushi Kabushiki Kaisha.
*2"Nocrac 300" is a trade name of a sulfur-containing hindered phenol, 4,4'-thio-bis(6-t-butyl-3-methylphenol):

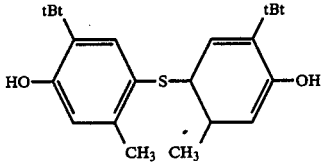

commercially available from Ouchi Shinko Kagaku Kogyo Kabushiki Kaisha.
*3"Irganox 1010" is a trade name of a hindered phenol, tetrakis[methylene-3(3,5-di-t-butyl-4-hydroxy-phenyl)propionate]methane:

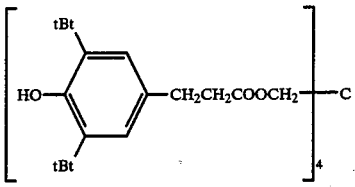

commercially available from Chiba-Geigy AG.

EXAMPLES 10 AND COMPARATIVE EXAMPLE 3

There were mixed 100 parts of the hydrogenated butadiene polymer having the group:

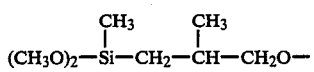

obtained in Reference Example 2, 1 part of Nocrac 300, 3 parts of tin octylate, 0.75 part of laurylamine, 50 parts of toluene and 0.5 part of water. The heat resistance was estimated in the same manner as in Example 1. The sheet was essentially not changed even after 40 days.

The procedure as above was repeated except that Nocrac 300 was not used (Comparative Example 3). The heat resistance was estimated in the same manner as in Example 1. The sheet was colored after 4 days, and it was browned and became sticky after 15 days.

EXAMPLES 11 TO 13 AND COMPARATIVE EXAMPLE 4

The procedure of Example 1 was repeated except that a compound shown in Table 2 was used as the component (B). A sheet having a thickness of about 1 mm was prepared in the same manner as in Example 1. The sheet was completely decomposed and began to flow at 150° C. by using a test tube heat aging tester. The time required for completely decomposing and beginning to flow is shown in Table 2 as deterioration time.

TABLE 2

| | Component (B) Kind | Component (B) Amount (part) | Deterioration time (day) |
| --- | --- | --- | --- |
| Ex. 11 | Nissan DLTP | 1 | 21 |
| Ex. 12 | Nocrac 300 | 1 | 24 |
| Ex. 13 | Nissan DLTP / Nocrac 300 | 1 / 1 | more than 50 |
| Com. Ex. 4 | — | — | 5 |

The curable resin composition of the invention can give a cured product having excellent heat resistance.

In addition to the ingredients used in the Examples, other ingredients can be used as set forth in the specification to obtain substantially the same results.

What we claim is:
1. A curable resin composition comprising:
   (A) 100 parts by weight of an elastomeric organic polymer of a saturated hydrocarbon selected from the group consisting of an isobutylene polymer and a hydrogenated polybutadiene, said organic polymer having at least one silicon-containing group cross-linkable by the formation of a siloxane bond at the molecular ends, and
   (B) 0.01 to 10 parts by weight of a sulfur-containing antioxidant selected from the group consisting of a sulfide of carboxylic acid ester and a sulfide of hindered phenol.

2. The composition of claim 1, wheren the amount of said component (B) is from 0.1 to 5 parts by weight based on 100 parts by weight of said component (A).

3. The composition of claim 1, wherein said cross-linkable group is an alkoxysilyl group.

4. The composition of claim 1, wherein said organic polymer is a polymer whose main chain is an isobutylene polymer.

5. The composition of claim 4, wherein said isobutylene polymer has a molecular weight of 500 to 30,000.

6. The composition of claim 4, wherein said isobutylene polymer has a molecular weight of 1,000 to 15,000.

7. The composition of claim 1, wherein said organic polymer is a polymer whose main chain is a hydrogenated polybutadiene.

8. The composition of claim 7, wherein said hydrogenated polybutadiene has a molecular weight of 500 to 30,000.

9. The composition of claim 7, wherein said hydrogenated polybutadiene has a molecular weight of 1,000 to 15,000.

* * * * *